United States Patent
Shimada

(10) Patent No.: US 7,671,556 B2
(45) Date of Patent: Mar. 2, 2010

(54) IMAGE SENSING APPARATUS

(75) Inventor: Makoto Shimada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 191 days.

(21) Appl. No.: 11/916,704

(22) PCT Filed: May 31, 2006

(86) PCT No.: PCT/JP2006/310844

§ 371 (c)(1),
(2), (4) Date: Dec. 6, 2007

(87) PCT Pub. No.: WO2006/132115

PCT Pub. Date: Dec. 14, 2006

(65) Prior Publication Data

US 2009/0224719 A1    Sep. 10, 2009

(30) Foreign Application Priority Data

Jun. 8, 2005    (JP) .............................. 2005-167726

(51) Int. Cl.
*H02P 8/00* (2006.01)
(52) U.S. Cl. .................. 318/696; 318/268; 318/685; 318/400.23; 318/400.42; 318/560; 323/201; 323/202; 323/203; 323/204
(58) Field of Classification Search ............... 318/696, 318/268, 400.23, 400.42, 685, 560; 323/201, 323/202, 203, 204

See application file for complete search history.

(56) References Cited

U.S. PATENT DOCUMENTS

| | | | | |
|---|---|---|---|---|
| 3,633,118 | A | * | 1/1972 | Means et al. .................. 330/5.5 |
| 5,748,206 | A | * | 5/1998 | Yamane ........................ 347/37 |
| 6,163,341 | A | * | 12/2000 | Kawaguchi et al. .......... 348/357 |
| 6,198,240 | B1 | * | 3/2001 | Notohara et al. ............. 318/268 |
| 6,249,095 | B1 | | 6/2001 | Takura |
| 6,619,778 | B2 | * | 9/2003 | Igarashi ........................ 347/19 |
| 7,026,775 | B2 | * | 4/2006 | Kokubo et al. ............... 318/268 |
| 2001/0001227 | A1 | * | 5/2001 | Notohara et al. ............. 318/268 |
| 2007/0024221 | A1 | * | 2/2007 | Yoshihisa et al. ............ 318/268 |

FOREIGN PATENT DOCUMENTS

| | | |
|---|---|---|
| JP | 61-114998 | 7/1986 |
| JP | 62-178161 | 8/1987 |
| JP | 62-254697 | 11/1987 |
| JP | 08-149891 | 6/1996 |
| JP | 2000-078385 | 3/2000 |
| JP | 2000-156998 | 6/2000 |
| JP | 2000-175478 | 6/2000 |
| JP | 2001-178193 | 6/2001 |

\* cited by examiner

*Primary Examiner*—Rita Leykin
(74) *Attorney, Agent, or Firm*—Fish & Richardson P.C.

(57) ABSTRACT

An image sensing apparatus, which has a constant-voltage driven stepping motor, comprises a PWM waveform generation part that generates pulse signals to be applied to switching devices; and a PWM waveform determination section that determines a PWM waveform to be generated by the PWM waveform generation section. The PWM waveform determination section determines, in accordance with the determined rotation speed value and output torque value of the stepping motor, a duty ratio range that is a range extending from the minimum to the maximum of the duty ratio of the pulse signals. It is designed that the higher the rotational speed value is, the wider the duty ratio width is.

8 Claims, 8 Drawing Sheets

IMAGE SENSING APPARATUS

TECHNICAL FIELD

The present invention relates to an image sensing apparatus, and more particularly to an image sensing apparatus provided with a stepping motor.

BACKGROUND ART

In applications where accurate movements are required, stepping motors, the rotation angle of which is controllable, are conventionally used instead of DC motors, and in image sensing apparatuses such as digital cameras and digital video cameras, stepping motors are used to achieve, for example, zooming. As a control device for controlling a stepping motor, a type that controls a stepping motor by constant-current chopper driving is disclosed (see, for example, Patent Publication 1).

For the purpose of keeping the motor drive current constant, a drive circuit incorporated in such a stepping motor using a constant-current drive system compares, by using a comparator, a voltage across a current-detection resistor for detecting a current flowing through the motor with a reference voltage set by a reference voltage division resistor, and, according to the comparison result, turns on or off the current that flows into the motor.

However, the above described drive circuit of the stepping motor controlled by a constant-current drive system typically needs to be provided with a number of analog circuit components such as a comparator, and thus, inconveniently, distortion of a sinusoidal wave is caused by offset adjustment, variations among individual devices, or the like. Particularly, around a midpoint, zero-cross distortion occurs, causing noise. Such being the case, when a constant-current drive system is used in a zoom-motor drive circuit of a digital video camera, the microphone of the digital video camera inconveniently picks up the noise.

Furthermore, a constant-current drive system needs to be provided with a current-detection resistor, and the current-detection resistor inconveniently consumes extra electric power.

Another controlling method for controlling a stepping motor, in which a stepping motor is controlled by a constant-voltage drive system instead of a constant-current drive system, is disclosed. In a constant-voltage drive system, a constant voltage is applied to a motor and coils are so switched as to be energized in rotation. Thus, there is no need for circuit components such as a comparator and the like which are necessary in a constant-current drive system for the purpose of keeping the current value constant. Thus, a constant-current drive system produces no distortion of a sinusoidal wave. In addition, there is no need for a resistor for current detection, either. Therefore, as compared with a constant-current drive system, a constant-voltage drive system is advantageous also from the viewpoint of power consumption.

Patent Publication 1: JP-A-2002-78385

DISCLOSURE OF THE INVENTION

Problems to be Solved by the Invention

However, in a constant-voltage drive system, when the motor rotates at a high speed, the current rise period is shorter than the energization switching period, and this does not allow a sufficient amount of current to flow, inconveniently hindering a desired amount of torque from being attained.

FIG. 8 is a graph showing the relationship between the rotation speed of the motor and the torque in a conventional stepping motor using a constant-voltage drive system. The horizontal axis indicates the rotation speed and the vertical axis indicates the torque value. As shown in FIG. 8, as the rotation speed increases, the impedance of the motor increases, and thus the torque decreases.

That is, when a constant-voltage drive system is used to drive a stepping motor, the problem of noise resulting from the distortion of a sinusoidal wave or the like does not arise as when a constant-current drive system is used, but there does exist a disadvantage that, as the rotation speed increases, the torque decreases so much that a necessary amount of torque cannot be attained.

It is true that, when a constant-current drive system is used to drive a stepping motor, the torque can be advantageously kept constant because the amount of current is kept constant, but the drive circuit in a constant-current drive system needs to be provided with a number of analog devices, and with the provision of a number of analog devices, noise is disadvantageously produced attributable to offset adjustment, variations among individual devices, or other factors. Therefore, if such a stepping motor is used in an image sensing apparatus, the microphone of the image sensing apparatus picks up motor drive noise.

Means for Solving the Problem

It is an object of the present invention to provide a low-noise image sensing apparatus in which torque can be maintained at a predetermined amount and less noise is produced even in a high-speed rotation condition.

To achieve the above object, an image sensing apparatus of the present invention is a type that includes a stepping motor of a constant-voltage driving type having a motor coil to which a constant voltage is applied via a switching device that is turned on or off by receiving a pulse signal, and the image sensing apparatus is provided with: a PWM waveform generation section generating the pulse signal fed to the switching device; a correction gain calculation section calculating a correction gain by multiplying an initial correction value stored internally by a predetermined factor determined according to a specified rotation speed of the stepping motor; and a duty ratio range determination section specifying, according to specified output torque of the stepping motor, a duty ratio range, which is a range between a minimum and a maximum duty ratio of the pulse signal, correcting the duty ratio range according to the correction gain fed from the correction gain calculation section, and feeding a corrected duty ratio range to the PWM waveform generation section. Here, the predetermined factor is so determined as to increase as the rotation speed value increases.

ADVANTAGES OF THE INVENTION

According to an image sensing apparatus of the present invention, even when the stepping motor is driven in a high-speed rotation condition, by automatically correcting the amplitude of the current supplied to the motor coil according to the rotation speed, it is possible to eliminate the disadvantage of torque reduction occurring in a high-speed rotation condition, a shortcoming of a constant-voltage drive system. Furthermore, since a constant-voltage drive system is used, noise is not produced as in the case where a constant-current drive system is used, and thus a silent operation of a motor can be achieved, thereby eliminating the disadvantage that the microphone of the image sensing apparatus picks up noise.

Moreover, this makes it possible to reduce the number of noise protection mechanisms that image sensing apparatuses need to be provided with, and thus the circuit board of the image sensing apparatus can be made compact.

Moreover, in the configuration of the present invention, a correction gain with which correction is performed according to the rotation speed value is automatically and univocally determined based on an initial correction value given beforehand externally, and this eliminates the need to provide complex inner mechanisms such as a feedback mechanism and the like. Therefore, torque correction can be achieved with a simple circuit configuration. Here, the configuration may additionally be such that the initial correction value described above can be changed externally as necessary, and thereby a flexible torque correction can be achieved.

Figure 1:
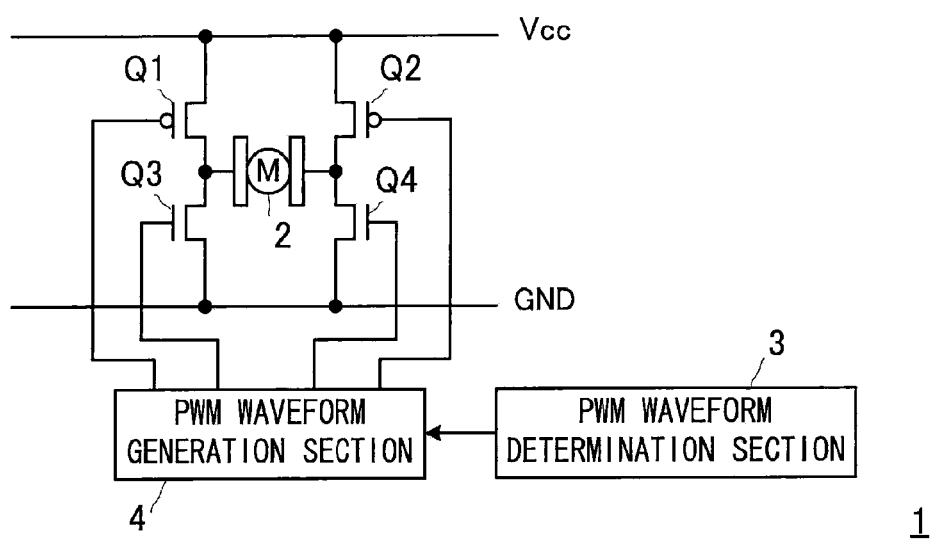
FIG. 1 A block diagram showing the configuration of the stepping motor incorporated in an image sensing apparatus embodying the present invention.

LIST OF REFERENCE SYMBOLS 1 stepping motor
2 motor coil
3 PWM waveform determination section
4 PWM waveform generation section
11 torque setting portion
12 rotation speed setting portion
13 correction gain calculation section
14 duty ratio range determination section
15 equal-width-pulse-interval determination section
21 binary conversion section
22 setting storage section
23 correction value determination section

BEST MODE FOR CARRYING OUT THE INVENTION

Hereinafter, embodiments of the present invention will be described with reference to the accompanying drawings. FIG. 1 is a block diagram showing the configuration of the stepping motor incorporated in an image sensing apparatus embodying the present invention. More specifically, the image sensing apparatus here is a digital camera, a digital video camera, or the like.

The stepping motor 1 shown in FIG. 1 is composed of: a motor coil 2, switching devices Q1 to Q4 for controlling the current supplied to the motor coil 2; a PWM waveform generation section 4 for generating pulse voltages for controlling the switching devices Q1 to Q4; and a PWM waveform determination section 3 for determining the PWM waveform generated by the PWM waveform generation section 4. The motor coil 2 may be composed of coils of a plurality of phases. In that case, the different coils are individually fed with currents of the different phases.

To the motor coil 2, a DC voltage Vcc is applied via the switching devices. When the switching devices Q1 and Q4 are on and the switching devices Q2 and Q3 are off, the motor rotates forward; when the switching devices Q2 and Q3 are on and the switching devices Q1 and Q4 are off, the motor rotates reversely. Unless otherwise stated, the following description deals with the case where a motor is made to rotate forward with pulse voltages applied to the switching devices Q1 and Q4; it should however be understood that the same description applies in the case where the motor is made to rotate reversely.

As will be described later, the PWM waveform determination section 3 determines, according to a torque value and a rotation speed value set externally, the PWM waveform to be generated by the PWM waveform generation section 4. More specifically, the PWM waveform determination section 3 determines the values of the maximum and minimum duty ratios of the PWM waveform and the interval at which waveforms having an equal duty ratio appear, and feeds these values to the PWM waveform generation section 4 as waveform determination parameters.

The PWM waveform generation section 4 generates a PWM waveform based on the waveform-determining parameters fed from the PWM waveform determination section 3. The PWM waveform generation section 4 may be provided with, for example: a clock generator for generating a clock signal having a constant frequency; a counter for counting the number of pulses in the clock signal generated by the clock generator; and a switching device. In that case, the PWM waveform generation section 4 may generate a pulse waveform by turning on or off the switching device at each time point that the counter has counted a predetermined number of pulses in the clock generated by the clock generator. In this configuration, the duty ratio of the outputted pulse wave can be changed according to the number of pulses in the clock the counter counts.

The PWM waveform generated and outputted by the PWM waveform generation section 4 is applied to predetermined ones of the switching devices Q1 to Q4, and these switching devices are turned on or off. The period for which electric power is supplied to the motor coil 2 is controlled by changing the timing with which the switching devices are turned on and off, and thus a desired rotation speed and desired torque can be attained.

Figure 2:
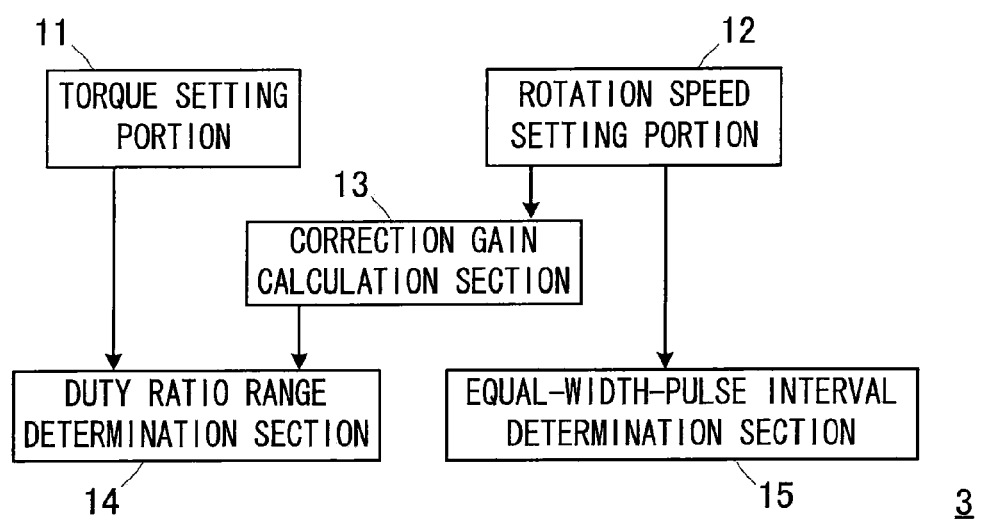
FIG. 2 A block diagram showing the configuration of the PWM waveform determination section 3 shown in FIG. 1.

FIG. 2 is a block diagram showing the configuration of the PWM waveform determination section 3. The PWM waveform determination section 3 is composed of: a torque setting portion 11 via which the value of the desired torque is set; a rotation speed setting portion 12 via which the rotation speed of the stepping motor 1 is set; a correction gain calculation section 13 calculating, according to the rotation speed set via the rotation speed setting portion 12, an amplitude correction value for the current supplied to the motor coil 2; a duty ratio range determination section 14 for determining, based on the correction gain calculated by the correction gain calculation section 13 and the torque value set beforehand via the torque setting portion 11, the range between the maximum and minimum duty ratios of the PWM waveform generated by the PWM waveform generation section 4; and an equal-width-pulse interval determination section 15 for determining, based on the rotation speed set via the rotation speed setting portion 12, the interval at which pulse signals having an equal duty ratio appear.

The user knows beforehand the value of the torque that is required to make the stepping motor 1 operate, and sets the value of the required torque via the torque setting portion 11. Also, the user adjusts the rotation speed of the stepping motor 1 by adjusting the rotation speed setting portion 12. The torque setting portion 11 and the rotation speed setting portion 12 may be so configured as to permit entry of target values by the user. The rotation speed setting portion 12 may be a knob or the like so that the rotation speed can be adjusted in an analog manner.

The data of the rotation speed set via the rotation speed setting portion 12 is fed to the correction gain calculation section 13, and the correction gain calculation section 13 calculates the correction gain corresponding to the rotation speed.

The correction gain calculation section 13 corrects the duty range of the PWM wave generated by the PWM waveform generation section 4 for the purpose of correcting, according to the rotation speed of the motor, the amplitude of the current to be supplied to the motor coils so that the stepping motor 1 can output the torque set via the torque setting portion 11. How a correction gain is calculated by the correction gain calculation section 13 will be described later.

The duty ratio range determination section 14, according to the torque set via the torque setting portion 11 and the correction gain calculated by the correction gain calculation section 13, determines the maximum and minimum duty ratios of the pulse signal outputted from the PWM waveform generation section 4 so that the stepping motor 1 actually outputs the torque set via the torque setting portion 11. The wider the range between the maximum and minimum duty ratios (duty ratio range) is, the larger is the amplitude of the current supplied to the motor coil 2; by contrast, the smaller the range between the maximum and minimum duty ratios is, the smaller is the amplitude of the current supplied to the motor coil 2.

The duty ratio range determination section 14 may store beforehand, in the form of a table, different values of the duty ratio range corresponding to different set torque values. In this case, when the duty ratio range determination section 14 receives a value of torque set via the torque setting portion 11, the duty ratio range determination section 14 may determine, with reference to the table, the duty ratio range before correction corresponding to that torque value, and then, according to the correction gain fed from the correction gain calculation section 13, may determine the duty ratio range of the PWM wave actually outputted from the PWM waveform generation section 4.

The equal-width-pulse interval determination section 15 determines the frequency of the waveform of the current supplied to the motor coil 2 so as to make the stepping motor 1 rotate at the rotation speed set via the rotation speed setting portion 12, and determines the interval at which pulses having an equal width appear in the PWM wave so that a current waveform having that frequency is outputted.

Figure 3A:
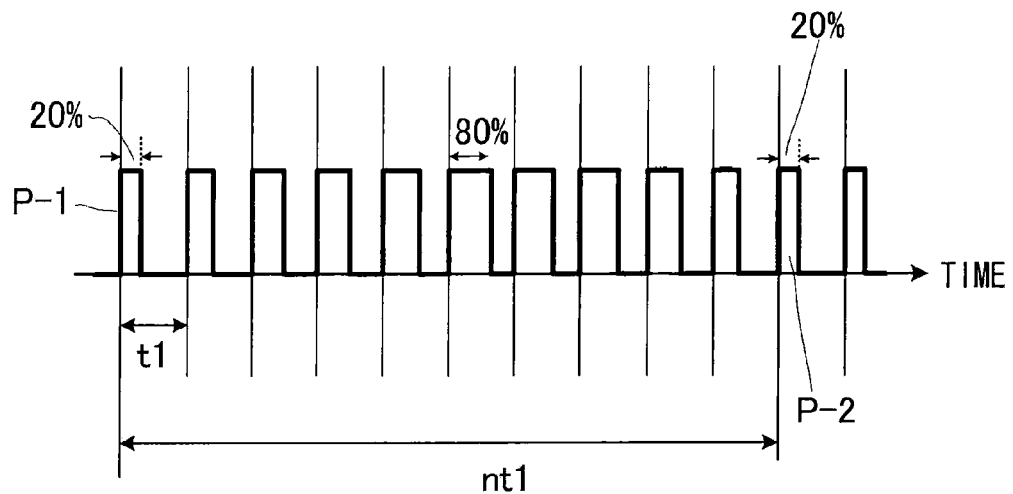
FIG. 3A A diagram showing an example of the PWM waveform generated by the PWM waveform generation section 4 shown in FIG. 1.
Figure 3B:
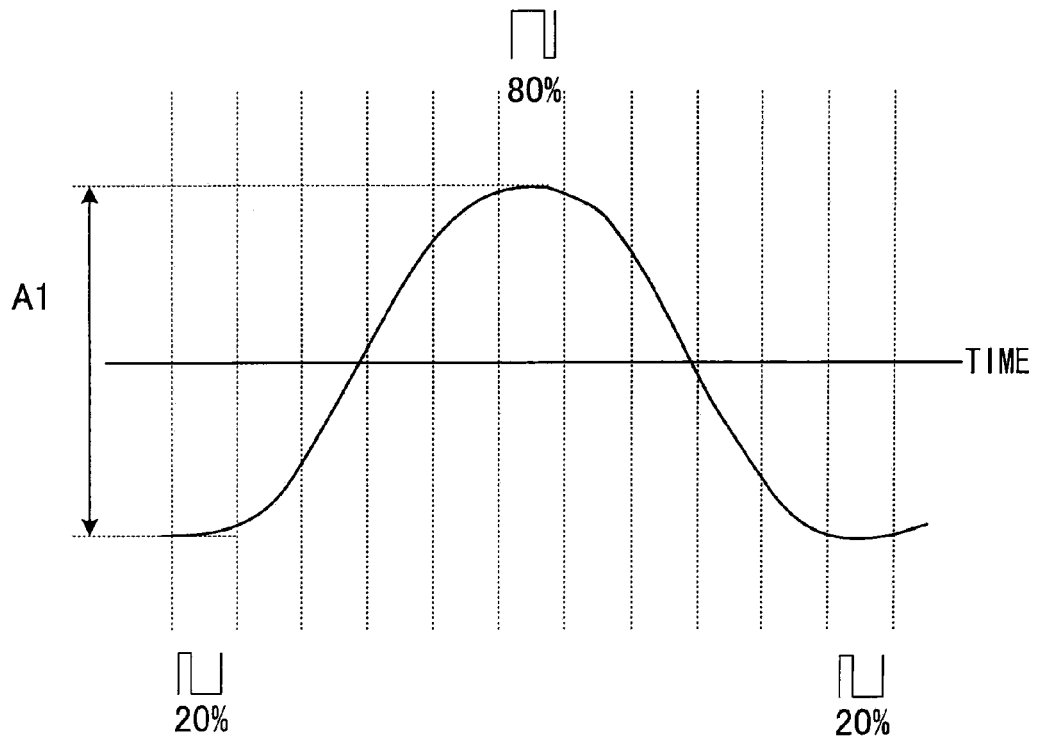
FIG. 3B A diagram showing an example of the waveform of the current supplied to the motor coil 2 when the PWM wave shown in FIG. 3A is inputted to a switching device.

FIG. 3A is a diagram showing an example of the PWM waveform generated by the PWM waveform generation section 4, and FIG. 3B is a diagram showing an example of the waveform of the current supplied to the motor coil 2 in the case where that PWM wave is inputted to a switching device. FIG. 3A shows the PWM waveform, and FIG. 3B shows the waveform of the current passed through the motor coil 2.

The PWM waveform shown in FIG. 3A is a PWM waveform the maximum duty ratio of which is 80% and the minimum duty ratio of which is 20%. The period t1 of the PWM waveform itself is univocally determined by a device incorporated in the PWM generating section 4. In addition, in FIG. 3A, it is assumed that the interval at which pulses having the same duty ratio appear is nt1. That is, nt1 indicates the interval between the time point at which a pulse P-1 having a duty ratio of 20%, i.e., the minimum duty ratio, appears and the time point at which a pulse P-2 having a duty ratio of 20% appears next time.

On the other hand, the current waveform shown in FIG. 3B is the waveform of the current supplied to the motor coil 2 when the PWM waveform shown in FIG. 3A is applied to the switching devices Q1 and Q4. As shown in the figure, when a pulse signal having a duty ratio of 20%, i.e., the minimum duty ratio, is fed, the current waveform shows its minimum value; when a pulse signal having a duty ratio of 80%, i.e., the maximum duty ratio, is fed, the current waveform shows its maximum value. In other words, the amplitude Al of the current supplied to the motor coil 2 is dependent on the difference between the maximum and minimum duty ratios of the pulse wave outputted from the PWM waveform generation section 4. The torque of the stepping motor is proportional to the current; thus, the larger the amplitude At of the current supplied to the motor coil 2 is, the larger the output torque is, and the smaller the amplitude A1 of the current supplied to the motor coil 2 is, the smaller the output torque is.

Figure 4A:
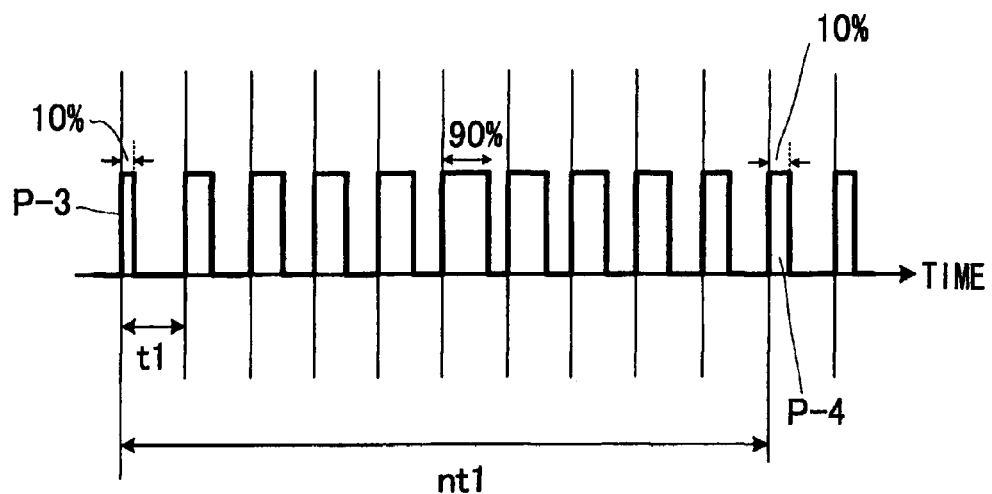
FIG. 4A A diagram showing an example of the PWM waveform generated by the PWM waveform generation section 4 shown in FIG. 1.
Figure 4B:
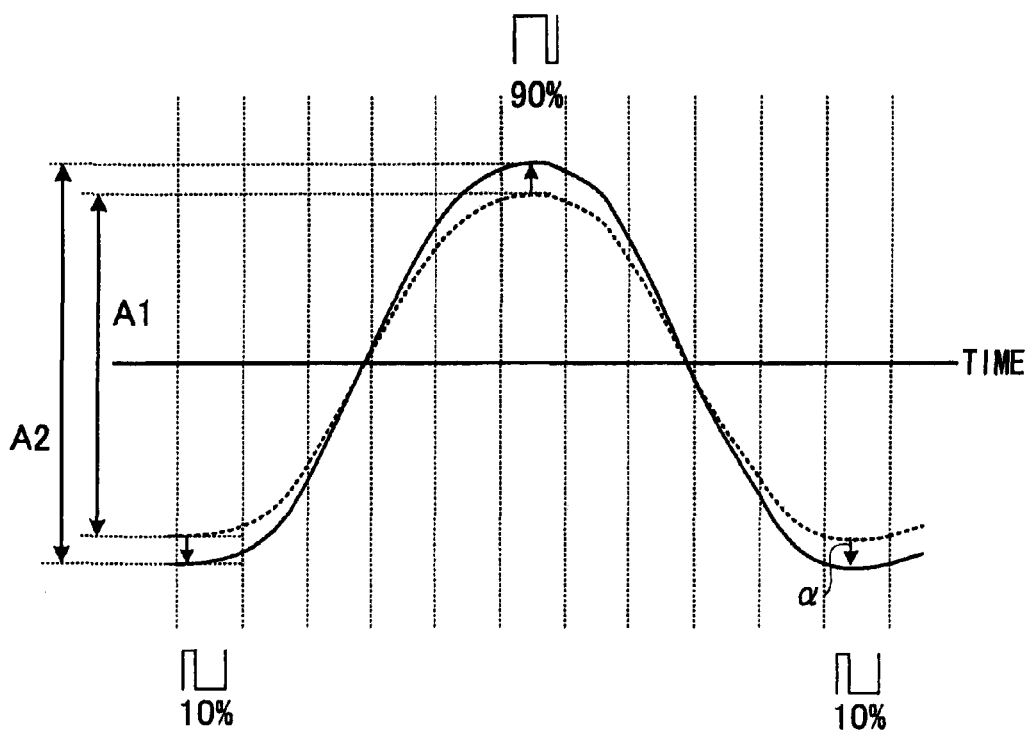
FIG. 4B A diagram showing an example of the waveform of the current supplied to the motor coil 2 when the PWM wave shown in FIG. 4A is inputted to a switching device.

Like FIGS. 3A and 3B, FIG. 4A is a diagram showing an example of the PWM waveform generated by the PWM waveform generation section 4, and FIG. 4B is a diagram showing an example of the waveform of the current supplied to the motor coil 2 in the case where that PWM wave is inputted to a switching device. Unlike FIGS. 3A and 3B, FIGS. 4A and 4B show the PWM waveform A and the current waveform B of the current flowing through the motor coil 2, respectively, when the maximum duty ratio is 90% and the minimum duty ratio is 10%. The rotation speeds in the cases shown in FIGS. 3 and 4 are the same, and the current waveform shown in F*ig*. 3B is again shown by the dotted line in FIG. 4B for comparison.

The PWM waveform shown in FIG. 4A is one set with the maximum duty ratio of 90% and the minimum duty ratio of 10%. Since, as described above, the rotation speed here is the same as in FIG. 3, the interval between pulses having an equal duty ratio is nt1, the same as in FIG. 3. That is, nt1 indicates the interval between the time point at which a pulse P-3 having a duty ratio of 10%, i.e., the minimum duty ratio, appears and the time point at which a pulse P-4 having a duty ratio of 10% appears next time.

As shown in FIG. 4B, when the PWM waveform having the duty ratio of 10%, i.e., the minimum duty ratio, is applied, the current waveform shows its minimum value; on the other hand, when the PWM waveform having the duty ratio of 90%, i.e., the maximum duty ratio, is applied, the current waveform shows its maximum value. Since, as described above, this difference between the minimum and maximum duty ratios affects the amplitude of the current waveform, as compared with the amplitude Al in the case where the minimum duty ratio is 20% and the maximum duty ratio is 80%, the amplitude A2 of the current waveform in the case where the minimum duty ratio is 10% and the maximum duty ratio is 90% becomes larger. Thus, the value of torque the stepping motor 1 outputs becomes larger.

The PWM waveform generation section 4 determines the PWM waveform that it outputs according to the value of the difference between the maximum and minimum duty ratios (duty ratio range) and the value of the equal-width pulse interval that are fed from the PWM waveform determination section 3. As described above, the value of the duty range affects the amplitude of the waveform of the current supplied to the motor coil 2, and the value of the interval at which equal-width pulses appear affects the frequency of the waveform of the current supplied to the motor coil 2.

Here, the configuration may additionally be such that, as described above, the timing with which the switching devices are turned on or off is changed by changing the number of pulses in the clock signal generated by the clock generator as counted by the counter, and thereby the duty ratio of a pulse wave outputted from the PWM waveform generation section 4 is changed.

Figure 5:
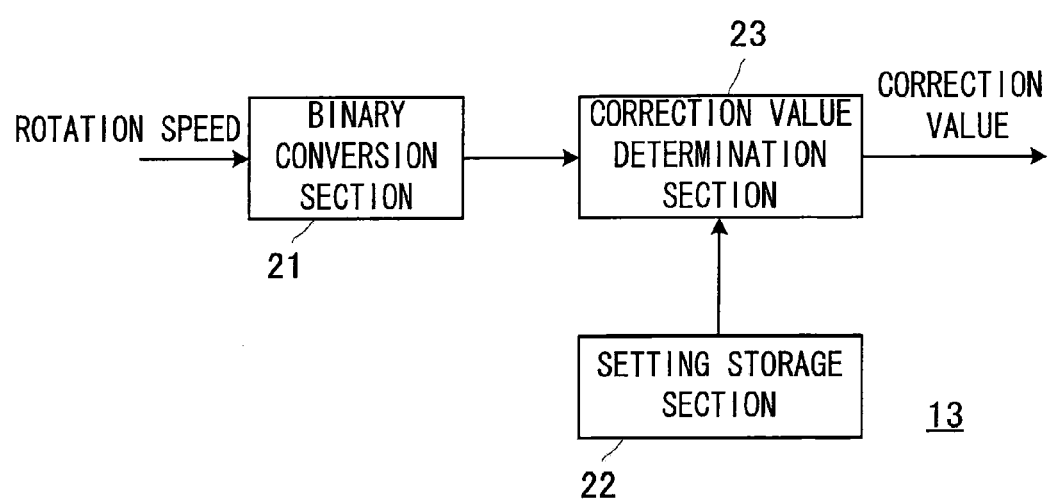
FIG. 5 A block diagram showing an example of the configuration of the correction gain calculation section 13 shown in FIG. 2.

Next, how the correction gain is calculated by the correction gain calculation section 13 will be described with reference to the accompanying drawings. FIG. 5 shows an example of the configuration of the correction gain calculation section 13.

The correction gain calculation section 13 is composed of: a binary conversion section 21 converting the rotation speed value fed from the rotation speed setting portion 12 to its binary equivalent; a setting storage section 22 storing an initial correction value set beforehand externally; and a correction value determination section 23 determining a correction value with which correction is actually performed based on the binary equivalent of the rotation speed value fed from the binary conversion section 21 and the initial correction value fed from the setting storage section 22. The correction value determined by the correction value determination section 23 is fed to the duty ratio range determination section 14.

The binary conversion section 21 converts the rotation speed fed from the rotation speed setting portion 12 to the binary equivalent thereof. For example, when it receives a rotation speed of 480 pps from the rotation speed setting portion 12, it feeds the correction value determination section 23 with 00111100000, which is the binary equivalent of 480; when it receives a rotation speed of 960 pps from the rotation speed setting portion 12, it feeds the correction value determination section 23 with 01111000000, which is the binary equivalent of 960; and when it receives a rotation speed of 1440 pps from the rotation speed setting portion 12, it feeds the correction value determination section 23 with 10110100000, which is the binary equivalent of 1440.

The correction value determination section 23 determines a correction value with reference to the value of the top two bits of the binary equivalent of the rotation speed value fed from the binary conversion section 21. At this time, the correction value determination section 23 reads the initial correction value from the setting storage section 22, and based on the initial correction value, calculates a correction value. Hereinafter, the initial correction value stored in the setting storage section 22 is represented by α.

For example, when the rotation speed is 480 pps, the value of the top two bits of its binary equivalent is "00", and the correction value determination section 23 determines the correction value by multiplying the initial correction value stored in the setting storage section 22 by 0. When the rotation speed is 960 pps, the value of the top two bits of its binary equivalent is "01", and the correction value determination section 23 determines the correction value by multiplying the initial correction value stored in the setting storage section 22 by 1. When the rotation speed is 1440 pps, the value of the top two bits of its binary equivalent is "10", and the correction value determination section 23 determines the correction value by multiplying the initial correction value stored in the setting storage section 22 by 2.

The duty ratio range determination section 14 determines the duty ratio range of the PWM waveform actually outputted from the PWM waveform generation section 4 based on the duty ratio range corresponding to the torque set via the torque setting portion 11 and a correction gain fed from the correction gain calculation section 13.

Figure 6:
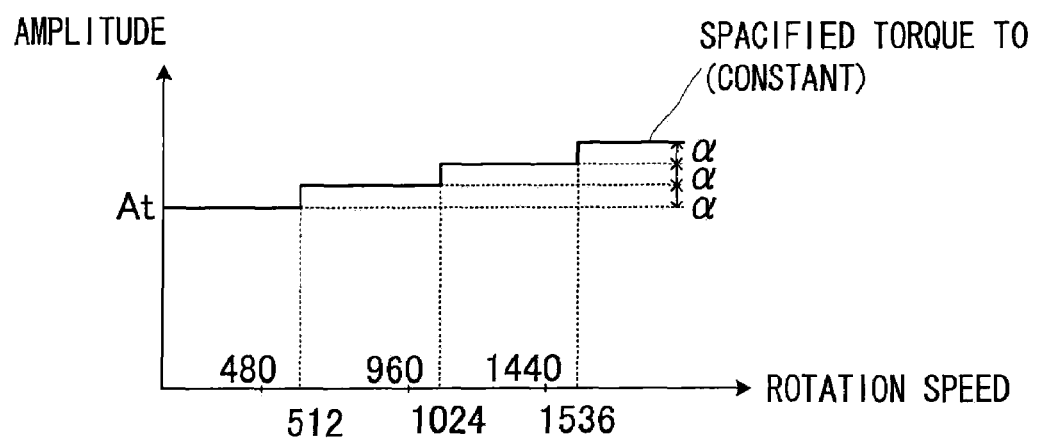
FIG. 6 A graph showing how the duty ratio range of the PWM waveform changes when the rotation speed set via the rotation speed setting portion 12 is changed while the torque value set at the torque setting portion 11 shown in FIG. 2 is kept constant.

FIG. 6 is a graph showing how the duty ratio range of the PWM waveform changes when the torque set via the torque setting portion 11 is 'T0' and the rotation speed set via the rotation speed setting portion 12 is varied. As described above, since the duty ratio range of the PWM wave affects the amplitude of the waveform of the current supplied to the motor coil 2, a wider duty ratio range allows the stepping motor 1 to output larger torque.

As shown in FIG. 6, in the range where the value of the top two bits of the binary equivalent is "00" (512 pps or less), the PWM waveform determination section 3 gives the PWM waveform generation section 4 an instruction to generate a PWM waveform that satisfies the predetermined duty ratio range Ad corresponding to the initial torque T0 in the range where the value of the top two bits is "01", that is, the value of the rotation speed is 512 pps or more and 1024 pps or less, the PWM waveform determination section 3 gives the PWM waveform generation section 4 an instruction to generate a PWM waveform that satisfies the duty ratio range determined by adding the initial correction value a to the duty ratio range Ad; in the range where the value of the top two bits is "10", that is, the value of a rotation speed is 1024 pps or more and 1536 pps or less, the PWM waveform determination section 3 gives the PWM waveform generation section 4 an instruction to generate a PWM waveform that satisfies the duty ratio range determined by adding the correction value 2α to the duty ratio range Ad; and in the range where the value of the top two bits is "11", that is, the value of a rotation speed is 1536 pps or more, the PWM waveform determination section 3 gives the PWM waveform generation section 4 an instruction to generate a PWM waveform that satisfies the duty ratio range determined by adding the correction value 3α to the duty ratio range Ad.

When such corrections are performed, as the rotation speed increases, the duty ratio range of the PWM waveform becomes wider, and thus the amplitude of the waveform of the current supplied to the motor coil 2 becomes larger, increasing the output torque of the stepping motor 1.

Figure 7:
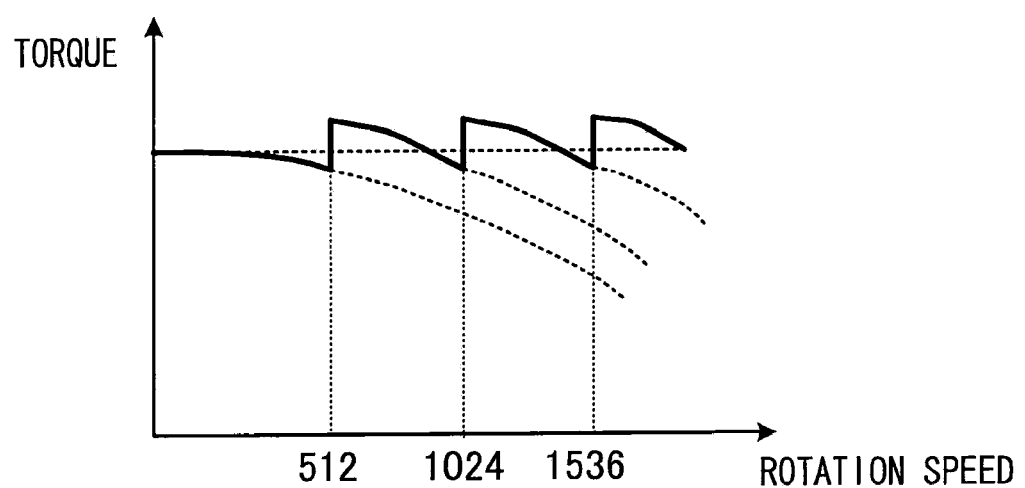
FIG. 7 A graph showing the rotation speed-torque characteristics of the stepping motor incorporated in an image sensing apparatus embodying the present invention.
Figure 8:
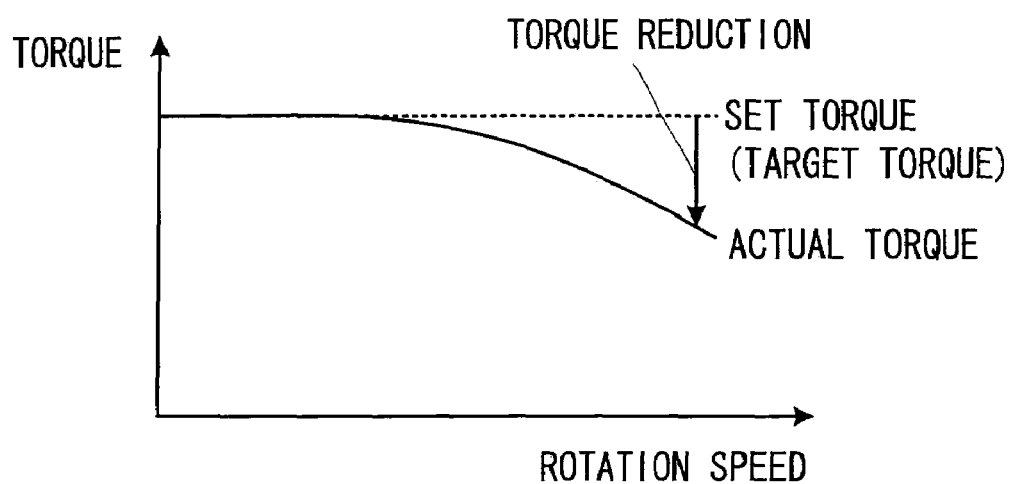
FIG. 8 A graph showing the relationship between the rotation speed and the torque of a conventional stepping motor using a constant-voltage drive system.

FIG. 7 is a graph showing the rotation speed-torque characteristics of the stepping motor incorporated in the image sensing apparatus embodying the present invention capable of torque correction corresponding to a rotation speed. As described above, when the rotation speed increases above a predetermined rotation speed, a correction gain is added to make the amplitude of the current supplied to the motor coil 2 larger. Thus, reduction of output torque, which is typically observed in the conventional stepping motor shown in FIG. 8, does not occur, and thus the output torque can be kept substantially constant.

According to an image sensing apparatus of the present invention, even when the stepping motor is driven in a high-speed rotation condition, by automatically correcting the amplitude of the current supplied to the motor coil according to the rotation speed, it is possible to eliminate the disadvantage of torque reduction occurring in a high-speed rotation condition, a shortcoming of a constant-voltage drive system. Furthermore, since a constant-voltage drive system is used, noise is not produced as in the case where a constant-current drive system is used, and thus a silent operation of a motor can be achieved, thereby eliminating the disadvantage that the microphone of the image sensing apparatus picks up noise. Moreover, this makes it possible to reduce the number of noise protection mechanisms that image sensing apparatuses need to be provided with, and thus the circuit board of the image sensing apparatus can be made compact.

Unlike in a stepping motor using a constant-current drive system, analog devices are not necessary, and hence no problem arises of offset or distortion of a sinusoidal wave resulting from the variations among individual devices and other factors. In addition, no resistor for current detection is necessary, either, and thus an image sensing apparatus can be realized that consumes less electric power than an image sensing apparatus using a constant-current drive system does.

Moreover, the configuration is such that the correction gain with which correction is performed according to the rotation speed is automatically univocally determined based on the initial correction value fed beforehand externally, and this eliminates the need of complex inner mechanisms such as a feedback mechanism and the like. Thus, torque correction can be achieved with a simple circuit configuration.

Moreover, the configuration may additionally be such that, the initial correction value stored in the setting storage section 22 can be changed externally so that the correction values calculated by the correction gain calculation section 13 can easily be changed externally. This helps achieve more flexible torque correction.

Also, in the configuration according to the present invention, a current whose amplitude reflects a predetermined correction gain corresponding to the rotation speed is supplied to the motor coil to make the motor output the desired torque, and no feedback mechanism for correction is provided. Thus, as compared with a configuration provided with a feedback mechanism for correction, the control mechanism for correction can be simplified.

In the above description, a configuration is dealt with in which the rotation speed is converted to its binary equivalent and the correction gain is determined according to the value of the top two bits of the binary equivalent of the rotation speed. However, it should be understood that the present invention is not limited to such a configuration. The present invention is characterized in that the correction gain to be added is univocally determined according to the rotation speed and based on the initial correction value fed beforehand externally, and that the initial correction value can be changed externally as necessary. Therefore, it should be understood that the present invention is not limited to image sensing apparatuses having the above described configuration but may be applied to any image sensing apparatus having the above described features.

INDUSTRIAL APPLICABILITY

An image sensing apparatus of the present invention can be suitably used as a digital camera, a digital video camera, or the like.

What is claimed is:

1. An image sensing apparatus including a stepping motor of a constant-voltage driving type, the stepping motor having a motor coil to which a constant voltage is applied via a switching device that is turned on or off by receiving a pulse signal, the image sensing apparatus comprising:
   a PWM waveform generation section to generate the pulse signal to be fed to the switching device;
   a correction gain calculation section to calculate a correction gain by multiplying an initial correction value stored internally beforehand by a predetermined factor determined according to a specified rotation speed of the stepping motor; and
   a duty ratio range determination section to:
      specify, according to specified output torque of the stepping motor, a duty ratio range, which is a range between a minimum and a maximum duty ratio of the pulse signal,
      correct the duty ratio range according to the correction gain fed from the correction gain calculation section, and
      feed a corrected duty ratio range to the PWM waveform generation section,
   wherein the predetermined factor increases as the rotation speed increases.

2. The image sensing apparatus of claim 1, wherein the rotation speed and the output torque of the stepping motor are specified externally.

3. The image sensing apparatus of claim 1, wherein the correction gain calculation section is arranged to calculate the correction gain by multiplying the initial correction value stored beforehand by the predetermined factor corresponding to the specified rotation speed of the stepping motor.

4. The image sensing apparatus of claim 1, wherein the correction gain calculation section is arranged to classify different rotation speed values of the stepping motor beforehand into a plurality of groups, and to change a value of the predetermined factor according to which group a given rotation speed value of the stepping motor belongs to.

5. The image sensing apparatus of claim 4, wherein the correction gain calculation section is arranged to convert the given rotation speed value of the stepping motor to a binary equivalent thereof, and to change the value of the factor according to a value of top two bits of the binary equivalent of the given rotation speed value.

6. The image sensing apparatus of claim 4, wherein the correction gain calculation section comprises:
   a binary conversion section to convert the rotation speed value to the binary equivalent thereof;
   a setting storage section to store the initial correction value set beforehand externally; and
   a correction value determination section to determine a value of the correction gain based on the binary equivalent of the rotation speed value fed from the binary conversion section and the initial correction value fed from the setting storage section.

7. The image sensing apparatus of claim 1, wherein the intial correction value can be changed externally.

8. The image sensing apparatus of claim 1, wherein the PWM waveform generation section includes:
   a clock generator to generate a clock signal; and
   a counter to count a number of pulses in the clock signal outputted from the clock generator;
   wherein the image sensing apparatus is arranged so that a duty ratio of the pulse signal generated by the PWM wavefrom generation section is changed according to the number of pulses in the clock signals outputted from the clock generator as counted by the counter.

* * * * *